(12) United States Patent
Schumacher et al.

(10) Patent No.: US 8,400,740 B2
(45) Date of Patent: *Mar. 19, 2013

(54) SHORT-CIRCUIT LIMITING DEVICE IN A LOW-VOLTAGE INSTALLATION

(75) Inventors: Andreas Schumacher, Dattenberg (DE); Peter Terhoeven, Alfter (DE)

(73) Assignee: Eaton Industries GmbH, Bonn (DE)

( * ) Notice: Subject to any disclaimer, the term of this patent is extended or adjusted under 35 U.S.C. 154(b) by 129 days.

This patent is subject to a terminal disclaimer.

(21) Appl. No.: 12/743,283

(22) PCT Filed: Oct. 30, 2008

(86) PCT No.: PCT/EP2008/009154
§ 371 (c)(1),
(2), (4) Date: Aug. 16, 2010

(87) PCT Pub. No.: WO2009/062600
PCT Pub. Date: May 22, 2009

(65) Prior Publication Data
US 2010/0296207 A1 Nov. 25, 2010

(30) Foreign Application Priority Data
Nov. 16, 2007 (DE) .......................... 10 2007 055 071

(51) Int. Cl.
*H02H 9/00* (2006.01)

(52) U.S. Cl. ....................................................... 361/54
(58) Field of Classification Search .................... 361/54, 361/55, 57, 67, 62
See application file for complete search history.

(56) References Cited

U.S. PATENT DOCUMENTS

| | | | | |
|---|---|---|---|---|
| 2,929,012 A | * | 3/1960 | Bohm | 363/52 |
| 2,932,708 A | * | 4/1960 | Jensen | 337/15 |
| 3,805,113 A | * | 4/1974 | Friedrich | 361/67 |

(Continued)

FOREIGN PATENT DOCUMENTS

| | | |
|---|---|---|
| DE | 4404074 A1 | 8/1995 |
| DE | 4438593 A1 | 5/1996 |

(Continued)

OTHER PUBLICATIONS

Smith, Problems Involving Industrial Plant-Utility, Power System Interties, IEEE Transactions on Industry Applications, 19751101 IEEE Service Center, Piscataway, NJ, US—ISSN 0093-9994, vol. IA-11, Nr: 6, pp. 636-640.

*Primary Examiner* — Ronald W Leja
(74) *Attorney, Agent, or Firm* — Leydig, Voit & Mayer, Ltd.

(57) ABSTRACT

A device for limiting a short-circuit current in an alternating-current low-voltage installation includes one or more supply lines having power-supply points with power-supply aggregates protected by feeder switches. The supply lines are separated at an isolating point into two line sections in response to a short circuit fault. One or more polyphase high-speed short-circuiting devices are coupled to the isolating point, having a current carrying capacity sufficient for short-circuit current intensities occurring on the supply line. The high-speed short-circuiting device performs a short-circuit switching operation at the isolating point in response to a trip signal. Two power circuit breakers are each connected in series between each of the line sections and the high-speed short circuiting device. A current-sensing device is coupled to each line section. The current-sensing device detects the short circuit fault, and transmits the trip signal to the high-speed short circuiting device.

14 Claims, 2 Drawing Sheets

U.S. PATENT DOCUMENTS

| | | | |
|---|---|---|---|
| 4,130,850 A * | 12/1978 | Cronin et al. | 361/54 |
| 2004/0027791 A1 * | 2/2004 | Marmonier et al. | 361/602 |
| 2008/0007881 A1 * | 1/2008 | Boeder et al. | 361/54 |

FOREIGN PATENT DOCUMENTS

| | | |
|---|---|---|
| DE | 19716826 A1 | 11/1998 |
| DE | 29823849 U1 | 4/2000 |
| DE | 10349552 A1 | 6/2005 |
| EP | 1052665 A2 | 11/2000 |
| EP | 1052665 B1 | 10/2004 |
| GB | 1121078 A | 7/1968 |
| WO | WO 0062320 A1 | 10/2000 |
| WO | WO 0133685 A1 | 5/2001 |
| WO | WO 0215361 A1 | 2/2002 |

* cited by examiner

SHORT-CIRCUIT LIMITING DEVICE IN A LOW-VOLTAGE INSTALLATION

CROSS-REFERENCE TO PRIOR APPLICATIONS

This applications is a U.S. National Phase application under 35 U.S.C. §371 of International Application No. PCT/EP2008/009154, filed on Oct. 30, 2008 and claims benefit to German Patent Application No. DE 10 2007 055 071.7, filed on Nov. 16, 2007. The International Application was published in German on May 22, 2009 as WO 2009/062600 A1 under PCT Article 21(2).

FIELD

The present invention relates to a limiting device for short circuits in an alternating-current low-voltage installation having at least one supply line.

BACKGROUND

A secure power supply includes the protection of the incoming power supply, as well as of the power distribution. These requirements must be met by a busbar distribution system, as well as by a cable system.

Therefore, power circuit breakers and an associated tripping system are adjusted in such a way that, when the need arises, only that power circuit breaker is tripped which is disposed directly upstream of the fault location for purposes of breaking fault currents. This selectivity should be limited to the section (the faulty electric circuit) that must be switched off in the event of a fault. All other system components should remain in operation. In this case, the tripping times of series-connected protection devices must be carefully adjusted to one another, and switching devices, as well as distribution systems (e.g., busbars or cables) must be able to conduct the short-circuit current during the total break time of the switching device, which is increased by the time delay required for the selectivity. This is referred to as the selective coordination of protection devices.

Protection and selectivity requirements, particularly in isolated power supply systems, are defined in classification and design regulations of certification firms, such as Germanischer Lloyd.

In an electrical system onboard a vessel, for example, the main source of electrical power is required to maintain the propulsion of the ship, and the main busbar can be divided into at least two sections which are normally connected by switches or other approved options. Whenever possible, the connections of the generators and of the coupled loads are to be uniformly apportioned among the busbar sections.

Groups of generators, loads and motor drives are connected to a supply line (for example, busbar). To electrically isolate at least two such groups in order to decouple them from one another in the case of a fault, an isolating point having a tie circuit breaker is devised. Subsequently to the opening of the tie circuit breaker (in the event of a fault), the two partial sections of a supply line are electrically independent of one another.

Rated currents on supply lines in an electrical system onboard a vessel can reach values of more than 8000 A, due to, for example, the high power demand at a voltage level of up to 690 V AC. This high power density pushes low-voltage switching devices to the limit of their performance capability. The tie circuit breaker, in particular, must be able to reliably switch off short-circuit currents of more than 100 kA. Conventional power circuit breakers are easily overloaded by such demands, so alternative solutions for limiting short-circuit currents are desirable.

Currents that occur during short circuits are extremely high. In one conventional solution, the current-carrying elements (e.g., cables or busbars) have correspondingly large conductor cross sections. Consequently, it is expensive to produce these circuit elements, particularly in view of the rising market prices for copper.

One alternative solution is to make use of a medium voltage in isolated low-voltage installations. However, due to safety considerations, medium voltage requires that the crew working on an isolated system include at least one authorized electrician.

German Patent Application Publication DE 10349552 A1 describes a short-circuit protection system used in low-voltage installations, which have a costly superconducting disconnector.

For high-speed short circuiting devices, German Patent Application Publication DE4438593 describes a short circuiting device having a thyristor-switching short circuit switch. German Patent Application Publication DE 4404074 describes a vacuum interrupter type switch. Some of these high-speed short circuiting devices are multiple short circuiting devices; others may be actuated only one single time (i.e., one-time short circuiting devices).

EP Patent Application Publication EP 1052 665 B1 and International Patent Application Publication WO 2000 62320 A1 describe a high-speed short circuiting device of the pyrotechnically operated type. This high-speed short circuiting device may induce a short circuit with an actuating time of less than 3 ms. The pyrotechnic drive drives a metallic pin through the stack of connection busbars, so that the phases are electrically and mechanically contacted among themselves within the actuating time, and a short circuit is produced. The pyrotechnically operated high-speed short circuiting devices are one-time short circuiting devices that must be replaced following a switching operation. In a low-voltage installation, an electrotechnically trained person may disassemble the actuated one-time short circuiting device and assemble a new high-speed short circuiting device.

SUMMARY

In an embodiment, the present invention provides a limiting device for limiting a short-circuit current in an alternating-current low-voltage installation. The limiting device includes one or more supply lines having power-supply points with power-supply aggregates protected by feeder switches. The supply lines are separable at an isolating point into a first and a second line sections in response to a short circuit fault. Each of the first and second line sections includes at least one power supply aggregate. The limiting device further includes at least one polyphase high-speed short-circuiting device coupled to the isolating point, having a current carrying capacity sufficient for short-circuit current intensities occurring on the supply lines. The at least one high-speed short-circuiting device is configured to perform a short-circuit switching operation at the isolating point in response to a trip signal. The limiting device further includes a first and a second power circuit breaker, respectively connected in series between the first and second line sections and the high-speed short-circuiting device. The first and second power circuit breakers has a break time that is shorter than that of the feeder switches. The limiting device further includes a respective current-sensing device coupled to each of the line sections. The current-sensing device is configured to detect a short circuit fault, and, in response thereto, transmit the trip signal to the at least one high-speed short-circuiting device so as to trigger the short-circuit switching operation.

BRIEF DESCRIPTION OF THE DRAWINGS

The present invention is described in greater detail in the figures, which show in particular.

DETAILED DESCRIPTION

Figure 1:
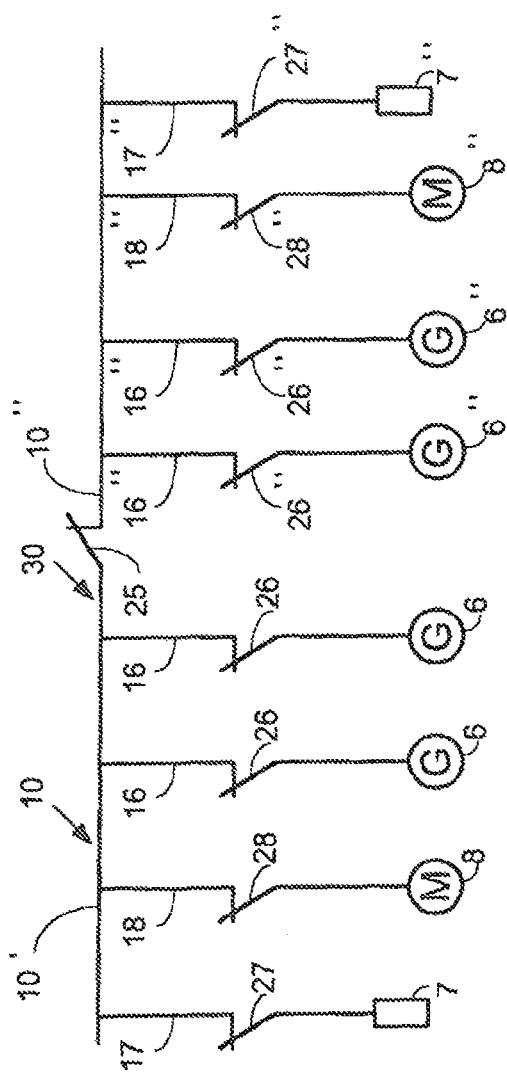
FIG. 1 depicts a schematic diagram of a low-voltage switchgear system having a tie circuit breaker in an isolating point.

The invention described herein provides a limiting device for short circuits in an alternating-current low-voltage installation having one or more supply lines in the form of cables or busbars, including loads and/or motor drives having power-supply points where power-supply aggregates are protected by incoming-feeder switches.

The device can be used in an electrical system onboard a vessel or in an offshore platform, or in a power supply for large industrial loads fed by medium voltages. Alternatively, the device can be used in a power supply for large industrial loads, for example, in automobile production lines. There, the power distribution has the topology of a ring (full ring or partial ring). The incoming power is supplied from the medium-voltage level via transformers into the supply lines.

In one embodiment, the present invention provides a protection system for supplying power on a low-voltage level that meets the requirements of an increasing power demand.

In particular, the present invention provides for a polyphase (in the case of three-phase current, a three-phase) high-speed short-circuiting device having sufficient current carrying capacity for short-circuit current intensities potentially occurring on supply lines, to be introduced into the isolating point. One power circuit breaker is connected in series in each case to the high-speed short circuiting device toward each line section, the power circuit breakers being superordinate to the incoming-feeder circuit breakers with respect to their break time. A current-sensing device is assigned to each line section, and, in response to the occurrence of a short circuit in one of the line sections, the current-sensing device detecting the short circuit transmits a trip signal to the high-speed short circuiting device(s) which subsequently undertake(s) a short-circuit switching operation in the isolating point.

In response to the detection and tripping of the short-circuit switching operation of the short-circuiting device, at least one of the two power circuit breakers opens in the isolating point. In the faulty line section, the protective circuit breaker devices provided, in particular, those feeder circuit breakers assigned to the power supply aggregates, experience the short-circuit current and interrupt the current path of the power supply aggregates. The opening of the power circuit breakers situated in the isolating point renders the two line sections electrically independent of one another. In the fault-free line section, the power supply is maintained since the partial section there is isolated from the short circuit.

The effective value of the short circuit current is reduced by the parallel short circuit produced by the short-circuiting device since the short-circuit current is divided between two existing "fault locations." The effect of the short circuit is mitigated in its intensity and limited with respect to one affected zone in the distribution system.

An advantage of the present invention is that the specified priority (or selectivity) between the feeder circuit breakers and the power circuit breakers in the isolating point leads to reduction in the short-circuit breaking capacity of the feeder circuit breakers. In other words, feeder circuit breakers having a lower power range can be used.

The high-speed short circuiting device may be installed in a coupling busbar that bridges the isolating point. This means that, mechanically, the isolating point has a greater length than the distance between the connection busbars of the high-speed short circuiting device. Thus, the ends of the line sections may be bridged by the coupling busbar.

The high-speed short circuiting device has a sufficient current carrying capacity for a short-circuit current intensity which is present in the system in the event of a short circuit fault.

In a further embodiment, a plurality of the high-speed short circuiting device can be used as discrete devices having a lower current carrying capacity that are each connected in parallel and acted upon. In this embodiment, two or more short circuiting devices, implemented as discrete devices having a lower current carrying capacity, perform the switching operation reliably and quickly.

In a further embodiment, the sensing threshold of the current-sensing device is adjustable and can be adjusted to two to four times of the rated current. In still a further embodiment, a current transformer is provided as the current-sensing device.

In an alternative embodiment, the supply lines of the low-voltage installation includes cables and/or busbars. The power-supply aggregates may be generators and/or transformers.

In still an alternative embodiment, the low-voltage supply installation may be an isolated system, such as, an electrical system onboard a vessel or in an offshore platform system.

In still an alternative embodiment, the supply lines of the supply system may have a linear or annular topology.

The power circuit breaker switched in the event of a short circuit in the isolating point, is electronically controllable and lockable. The power circuit breaker remains open, as long as the high-speed short circuiting device, which is not re-actuatable once actuated, is present in the system. As a result, a protection is provided against a repeated (unintentional) reclosure on the existing short circuit.

The system provided by the present invention can be used in low-voltage installations, with voltage level ranges in, for example, 400-690 V.

Groups of generators, loads and motor drives are connected to a supply line (for example, busbar). To electrically isolate at least two such groups in order to decouple them from one another in the case of a fault, an isolating point having a tie circuit breaker is provided. When the tie circuit breaker is opened in the event of a fault, the two portions of the supply line are electrically independent of each other.

FIG. 1 shows schematically a low-voltage switchgear system having a tie circuit breaker in an isolating, or separation point, for example, a low-voltage installation in an on-board electrical system.

Figure 2:
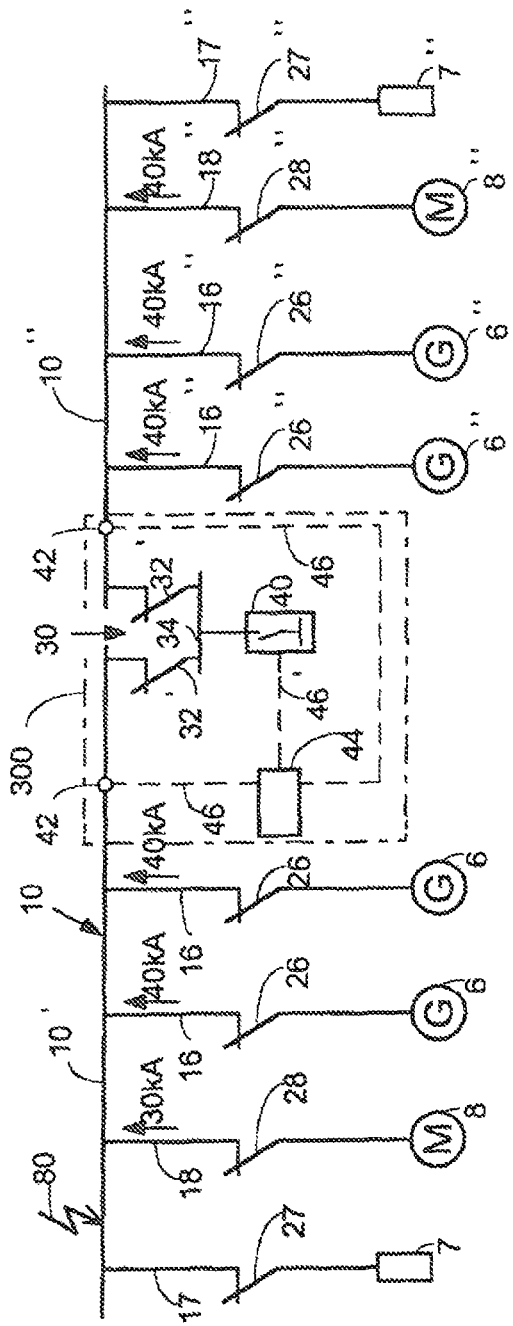
FIG. 2 depicts a switchgear system having a device for limiting and switching off short circuit currents.

A supply line 10 in the form of a busbar is shown, to which power-supply aggregates (for example, diesel powered generators) 6, loads 7 and motor drives 8 are connected. The generators supply the electrical power that is fed to the loads and the motor drives. To electrically isolate at least two such groups in order either to operate them independently or to decouple them from one another in the case of a fault, a tie circuit breaker 25 is installed in supply line 10, thereby creating an isolating point 30. To the greatest degree possible, isolating point 30 is situated in such a way that, in terms of their numbers, power-supply aggregates and motor drives are disposed symmetrically thereto: this is represented in FIGS. 1 and 2 by two generators and one motor drive on each of the two sides of the isolating point. In response to the opening of tie circuit breaker 25, the two supply line sections 10', 10" are electrically independent of one another. Tie circuit breaker 25 must have a particularly high short-circuit breaking capacity to be effective in the event of a fault.

Increasing demands on electric power in a supply system 10 may lead to overloading of tie circuit breaker 25. To protect the system at the event of short circuiting, an isolating point 30, which corresponds approximately to the position of tie circuit breaker 25 in FIG. 1, is inserted in supply line 10. To provide improved protection, instead of one particular tie circuit breaker, two power circuit breakers 32' and 32" are used in the system.

As in FIG. 1, a plurality of electrical aggregates (generators 6, motor drives 8, loads 7) are connected to supply lines 10', 10" via corresponding current paths 16, 17, and 18 and protected by power circuit breakers 26, 27, 28. The reference numerals of the aggregates of busbar section 10" are indicated by double quotation marks.

High-speed short circuiting device 40 situated in current path 34 is protected on both sides by power circuit breakers 32' and 32" from the two busbar sections 10', 10". The current on the supply line (busbar 10, respectively on partial sections 10' and 10" thereof) is monitored by current sensors (for example, magnetic transducers or Hall-effect sensors) 42. The sensing threshold of the current sensors is adjustable and should be adjusted to a multiple of the rated current. The configuration of high-speed short-circuit devices including series-connected power circuit breakers, and the interconnection with current-sensing devices (42, 44, and 46) should be referred to, in short, as 'short-circuiter/isolator combination' 300.

The break times of power circuit breakers 32' and 32" range from 150 to 200 ms; the break times of feeder circuit breakers 26 that protect the power-supply aggregates (generators 6) range from 300 to 500 ms; and the break times of outgoing-feeder circuit breakers 28 upstream of motor drives 8 are within a region shorter than 100 ms. One aspect of the present invention is that the selectivity of the participating switches is defined in such a way that three time ranges are provided for the break times that do not overlap, respectively whose limits are preferably not mutually proximate.

According to another embodiment of the present invention shown in FIG. 2, switches 26, 27, 28, 32', and 32" are closed to allow energy flow through the low-voltage system. When a short circuit 80 (in partial section 10') occurs, due to an arcing fault or some other short circuits, the generators and the motor drives, which function as generators in the event of a short circuit, feed current to supply line 10. The current intensities of 30, which is substantially equal to 40 kA indicated by the current arrows, are typical short circuit current values. In typical low-voltage systems having a plurality of generators and a plurality of motor drives, the effective values of the short circuit currents in the supply line may add up to over 100 kA; in critical cases up to 200 kA.

The short circuit situation is detected by current sensors 42 since the fault current is above the presettable threshold, for example, of two times the rated current. Current sensors 42 transmit a detection signal 46' via a data line to an electronic central processing unit 44, which then delivers a trip signal 46" to high-speed short-circuit device 40. Due to the forced metallic (galvanic) short circuit of the short-circuit device, power circuit breaker 32" opens more rapidly in current path 34 than all feeder circuit breakers 26.

Due to the rapid interruption of the current surge originating from generators 6" and motors 8" in response to the opening of power circuit breaker 32", the duration of the short-circuit current loading in line section 10" is not long enough to allow feeder circuit breakers 26" to respond.

The selectivity of switches (32', 32", 26, 26") has already been previously discussed. The break time of power circuit breakers (32', 32") in the isolating point is shorter than that of downstream feeder circuit breakers 26, 26". Feeder circuit breakers 26 open at lower priority and now only isolate faulted line section 10' from supplying aggregates (6).

Right line section 10" is no longer affected by short circuit 80 (in the left line section), and fault-free line section 10" continues to operate unchanged. The short circuit does not lead to the failure of the overall operation at supply line 10. A partial operation may be maintained, and essential systems to be supplied with power do not suffer any damage. For an electrical system on board a vessel, this means, for example, that drive and control systems or cooling aggregates for containers are not affected by a total loss of power, and at least parts of such systems remain functional until the fault is removed.

Following the emergency shutoff, a fault investigation must be conducted to determine where and how the fault has occurred. Once the fault has been eliminated and the actuated high-speed short-circuit device has been replaced with a functional high-speed short-circuit device, the voltage may be gradually increased again in the supply system.

Figure 3:
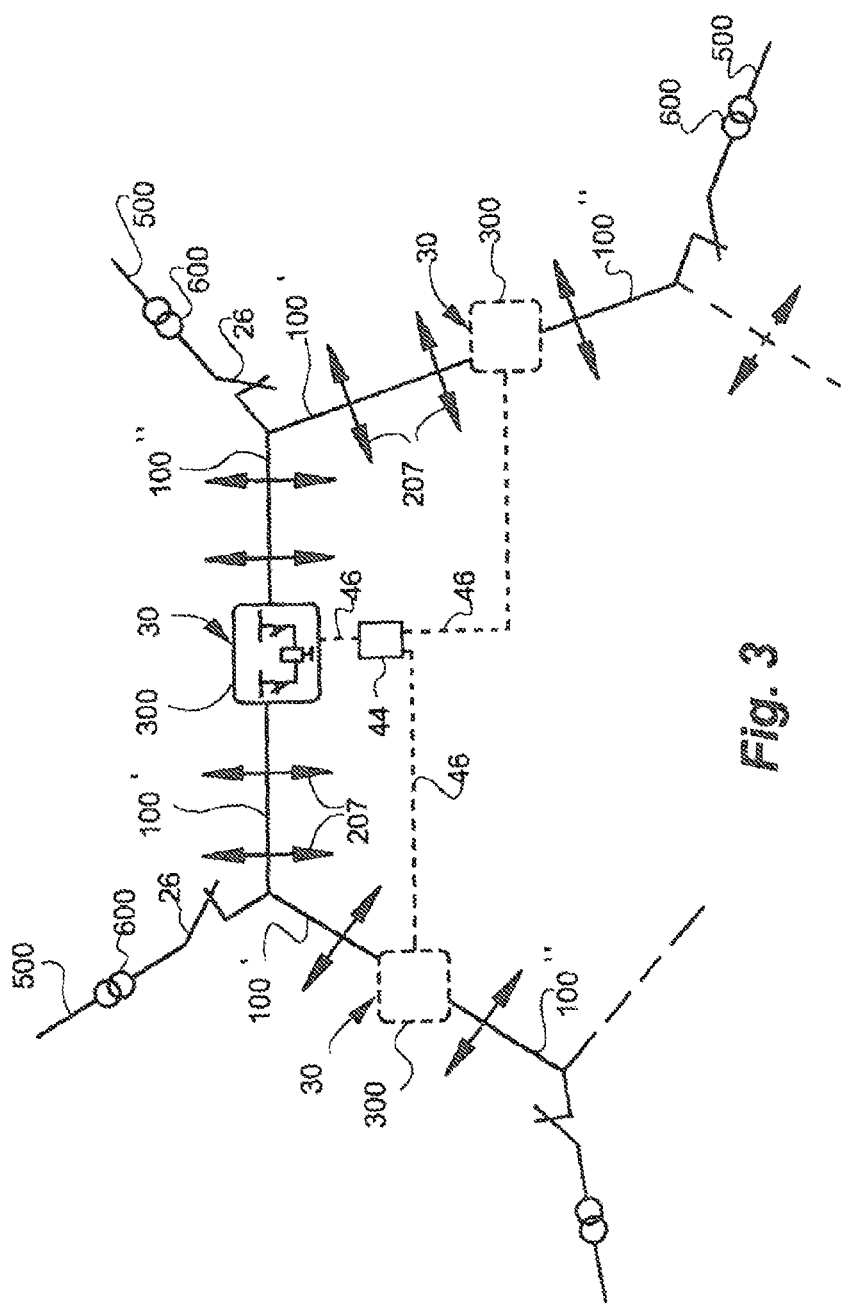
FIG. 3 depicts a schematic diagram of a power supply for large industrial loads.

FIG. 3 illustrates another embodiment, where power is supplied in the form of a ring (full ring or partial ring) for large industrial loads, for example, in automobile production lines. The voltage level of loads 207 is low voltage; and the incoming power is supplied from medium-voltage level 500 via transformers 600 into supply lines (100' and 100"). The limiting device according to the present invention is illustrated with reference to this example where a supply system having more than one isolating point 30 is required.

Transformers 600 are disconnectable from the ring system via incoming-feeder power circuit breakers 26. Each supply line between two incoming-supply (feed-in) points is divided into two sections 100' and 100". Isolating points 30 are taken up by short-circuiter/isolator combinations 300 (including current sensors 42), as already discussed with reference to FIG. 2. As in the linear system (FIG. 2), a current-sensing device 42 is assigned to each supply line section 100', 100". The indicator lines of current-sensing device 42 converge in a central processing unit (lines 46), from where short-circuit devices 40 of combinations 300 may be acted upon.

The detection of a short circuit and the functionality of short-circuiter/isolator combinations 300 in a ring system in accordance with FIG. 3 correspond to the operational sequences in a linear system, as illustrated in FIG. 2. The speed of the detection and the desired rapid isolation of the line sections eliminate the need for detecting the location of the short circuit. All isolator combinations 300 act simultaneously, so that all isolating points 30 open in unison.

While the invention has been described with reference to particular embodiments thereof, it will be understood by those having ordinary skill in the art that various changes may be made therein without departing from the scope and spirit of the invention. Further, the present invention is not limited to the embodiments described herein; reference should be made to the appended claims.

The invention claimed is:

1. A limiting device for limiting a short-circuit current in an alternating-current low-voltage installation, including one or more supply lines having power-supply points with power-supply aggregates protected by feeder switches, the supply lines being separable at an isolating point into a first and a second line sections in response to a short circuit fault, each of the line sections including at least one power supply aggregate, the limiting device comprising:
   at least one polyphase high-speed short-circuiting device coupled to the isolating point, having a current carrying capacity sufficient for short-circuit current intensities occurring on the supply lines, the at least one high-speed short-circuiting device being configured to perform a short-circuit switching operation at the isolating point in response to a trip signal by contacting phases of the supply lines with each other;
   a first and a second power circuit breaker, respectively connected in series between the first and second the line sections and the high-speed short-circuiting device, the first and second power circuit breakers having a break time that is shorter than that of the feeder switches; and
   a respective current-sensing device coupled to each of the line sections, the current-sensing device being configured to detect a short circuit fault, and, in response thereto, transmit the trip signal to the at least one high-speed short-circuiting device so as to trigger the short-circuit switching operation.

2. The limiting device as recited in claim 1,
   wherein the at least one high-speed short-circuiting device includes two high-speed short-circuiting devices coupled in parallel so as to provide a current carrying capacity sufficient for the current intensities generated by the short-circuit fault.

3. The limiting device as recited in claim 1,
   wherein the supply lines include at least one of a cable and a busbar.

4. The limiting device as recited in claim 1,
   wherein the power-supply aggregates include at least one of a generator and a transformer.

5. The limiting device as recited in claim 1,
   wherein the supply lines are disposed in an isolated system.

6. The limiting device as recited in claim 5,
   wherein the supply lines are disposed in an electrical system onboard a vessel.

7. The limiting device as recited in claim 5,
   wherein the supply lines are disposed in an offshore platform system.

8. The limiting device as recited in one of claims 1,
   wherein the supply lines form a ring.

9. The limiting device as recited in claim 1,
   wherein the at least one high-speed short-circuiting device includes a one-time short-circuiting device.

10. The limiting device as recited in claim 9,
    wherein the at least one high-speed short circuiting device includes a pyrotechnically-operated high-speed short-circuiting device.

11. The limiting device as recited in claim 1,
    wherein the current-sensing device has an adjustable sensing threshold.

12. The limiting device as recited in claim 11,
    wherein the sensing threshold is adjustable to a value of substantially from two to four times a rated current.

13. The limiting device as recited in claim 1,
    wherein the power circuit breakers are electronically controllable and configured to lock in an open position when the at least one the high-speed short-circuiting device is actuated.

14. The limiting device as recited in claim 1,
    wherein the current-sensing device includes a current transformer.

* * * * *